United States Patent
Huang et al.

(10) Patent No.: US 12,017,502 B2
(45) Date of Patent: Jun. 25, 2024

(54) PARKING AIR CONDITIONING DEVICE AND MOUNTING BRACKET THEREOF

(71) Applicant: HUIZHOU ROYPOW TECHNOLOGY CO., LTD, Huizhou (CN)

(72) Inventors: Guoai Huang, Huizhou (CN); Quanfu Zou, Huizhou (CN)

(73) Assignee: HUIZHOU ROYPOW TECHNOLOGY CO., LTD, Huizhou (CN)

( * ) Notice: Subject to any disclaimer, the term of this patent is extended or adjusted under 35 U.S.C. 154(b) by 227 days.

(21) Appl. No.: 17/862,965

(22) Filed: Jul. 12, 2022

(65) Prior Publication Data
US 2023/0356560 A1 Nov. 9, 2023

(30) Foreign Application Priority Data
May 5, 2022 (CN) .......................... 202221059954.6

(51) Int. Cl.
*B60H 1/00* (2006.01)
(52) U.S. Cl.
CPC ..... *B60H 1/00507* (2013.01); *B60H 1/00357* (2013.01)
(58) Field of Classification Search
CPC ............ B60H 1/00507; B60H 1/00357; B60H 1/00428; B60R 16/005; B60R 16/0237; B60R 16/04; Y02T 10/88
See application file for complete search history.

(56) References Cited

U.S. PATENT DOCUMENTS

| | | | | |
|---|---|---|---|---|
| 4,365,484 A | * | 12/1982 | Carson | F25D 19/003 |
| | | | | 62/239 |
| 4,736,597 A | * | 4/1988 | Anderson | B60H 1/3232 |
| | | | | 62/239 |
| 4,787,215 A | * | 11/1988 | Bleck | B60P 3/20 |
| | | | | 62/239 |

FOREIGN PATENT DOCUMENTS

| CN | 111120805 A | * | 5/2020 | |
|---|---|---|---|---|
| WO | WO-2007106066 A2 | * | 9/2007 | ........... B60H 1/3232 |

* cited by examiner

*Primary Examiner* — Emmanuel E Duke (57) ABSTRACT

A parking air conditioning device and a mounting bracket thereof are provided. The mounting bracket includes a loading frame. The loading frame includes a bottom bracket and a first connecting member fixedly connected to the bottom bracket to form a mounting position. The mounting frame includes a second connecting member and a plurality of first bolts. The second connecting member is located at a side of the first connecting member away from the mounting position and is spaced apart from the first connecting member. The first bolts are connected to the first connecting member and the second connecting member. When the mounting bracket is connected to a vehicle body crossbeam, the first bolts are respectively located at the upper and lower sides of the vehicle body crossbeam, and the first connecting member and the second connecting member clamp the vehicle body crossbeam.

11 Claims, 6 Drawing Sheets

PARKING AIR CONDITIONING DEVICE
AND MOUNTING BRACKET THEREOF

CROSS-REFERENCE TO RELATED
APPLICATIONS

This application claims priority to and/or benefit from Chinese patent application No. 202221059954.6, filed May 5, 2022, entitled PARKING AIR CONDITIONING DEVICE AND MOUNTING BRACKET THEREOF, the content of which is hereby incorporated by reference in its entirety.

TECHNICAL FIELD

The present disclosure relates to parking air conditioning devices, in particular to a parking air conditioning device and a mounting bracket thereof.

BACKGROUND

Parking air conditioner is a kind of air conditioner in the car. It refers to a device that uses the on-board battery DC power supply (12v/24v/36v) to make the air conditioner operate continuously, adjusts and controls the temperature, humidity, flow rate and other parameters of the ambient air in the car, which fully meets the comfortable cooling needs of truck drivers.

According to the survey, long-distance truck drivers drive on the road 80% of the time in a year, and 47.4% of the drivers choose to spend the night in the car. Using the original car air conditioner not only consumes a lot of fuel, but also is easy to wear the engine, and even has the risk of carbon monoxide poisoning. Based on this, the parking air conditioner has become an indispensable long-distance rest partner for truck drivers.

Although the parking air conditioner, as a supporting device for trucks, vans or engineering vehicles, can solve the problem that the air conditioner thereof cannot be used when the truck, the van or the engineering vehicle is parked. However, when mounting the parking air conditioner on a vehicle body, it is necessary to drill holes at corresponding positions of the vehicle body, which is easy to damage a structure of vehicle body and reduce a strength of the vehicle body. In addition, an installation of the parking air conditioner is unstable, which is easy to fall off from the vehicle body and cause driving safety accidents.

SUMMARY

According to various embodiments of the present application, a parking air conditioning device and a mounting bracket thereof are provided.

According to an aspect of the disclosure, a mounting bracket configured to be connected to a vehicle body crossbeam includes: a loading frame including a bottom bracket, a first connecting member, a second connecting member and a plurality of first bolts, the bottom bracket is configured to support an energy storage module, the first connecting member is fixedly connected to the bottom bracket to form a mounting position cooperatively, and the mounting position is configured to load the energy storage module, the second connecting member is located on a side of the first connecting member away from the mounting position and spaced apart from the first connecting member, the plurality of first bolts are connected to the first connecting member and the second connecting member, when the mounting bracket is connected to the vehicle body crossbeam, the plurality of first bolts respectively located at an upper side and a lower side of the vehicle body crossbeam, and enabling the first connecting member and the second connecting member to clamp the vehicle body crossbeam According to an aspect of the disclosure, a parking air conditioning device mounted to a vehicle body crossbeam includes an air conditioning host, an energy storage module configured to supply power to the air conditioning host and a mounting bracket, the mounting bracket includes a loading frame, a first connecting member, a second connecting member and a plurality of first bolts, the loading frame includes a bottom bracket and a first connecting member, the bottom bracket is configured to support the energy storage module, the first connecting member is fixedly connected to the bottom bracket to form a mounting position cooperatively, and the mounting position is configured to load the energy storage module, the second connecting member is located on a side of the first connecting member away from the mounting position and spaced apart from the first connecting member, the plurality of first bolts are connected to the first connecting member and the second connecting member, when the mounting bracket is connected to the vehicle body crossbeam, the plurality of first bolts respectively located at an upper side and a lower side of the vehicle body crossbeam, and enabling the first connecting member and the second connecting member to clamp the vehicle body crossbeam.

Details of one or more embodiments of the present application will be given in the following description and attached drawings. Other features, objects and advantages of the present application will become apparent from the description, drawings, and claims.

BRIEF DESCRIPTION OF THE DRAWINGS

In order to illustrate the embodiments of the present disclosure more clearly, the drawings used in the embodiments will be described briefly. Apparently, the following described drawings are merely for the embodiments of the present disclosure, and other drawings can be derived by those of ordinary skill in the art without any creative effort.

DETAILED DESCRIPTION

The present disclosure will now be described in detail with reference to the accompanying drawings and embodiments in order to make the objects, technical solutions, and advantages of the present disclosure more clear. It should be understood that the specific embodiments described herein are only for explaining the present disclosure, and not intended to limit the present disclosure.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, members, and/or components, but do not preclude the presence or addition of one or more other features, integers, steps, operations, members, components, and/or groups thereof.

It will be understood that when a member is referred to as being "connected" or "coupled" to another member, it can be directly connected or coupled to the other member or intervening members may be present. In contrast, if a member is referred to as being "directly connected" or "directly coupled" to another member, there are no intervening members present.

It will be understood that, although the terms first, second, etc. may be used herein to describe various members, these members should not be limited by these terms. These terms are only used to distinguish one member from another. Thus, a first member could be termed a second member without departing from the teachings of the present invention.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Figure 1:
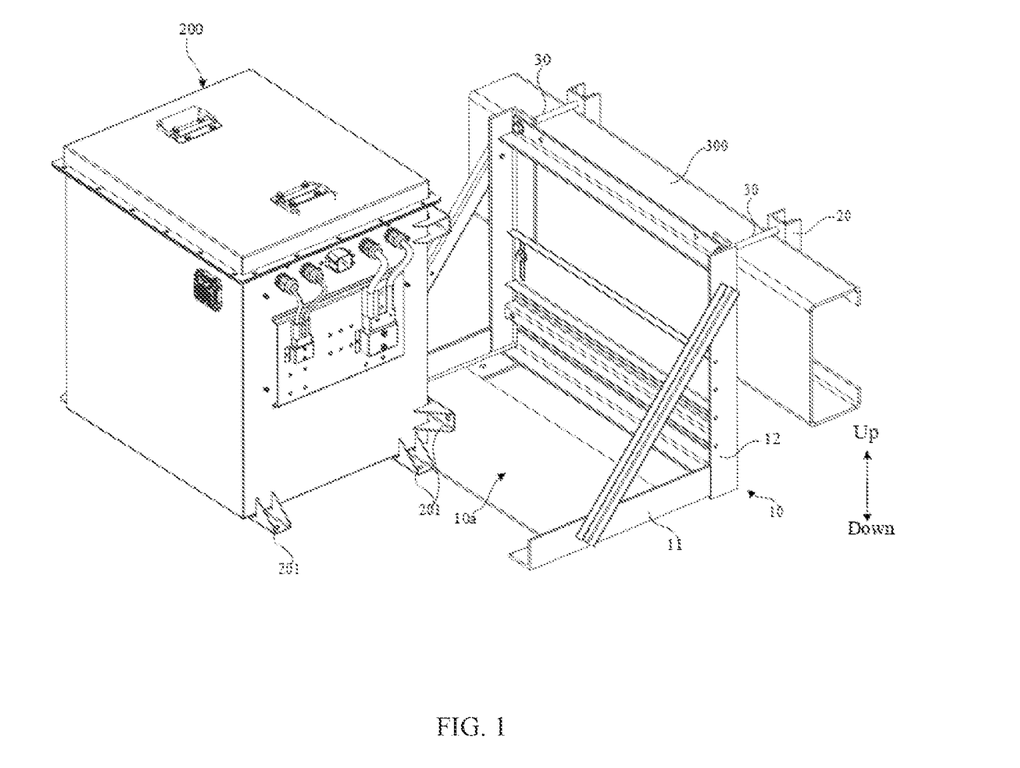
FIG. 1 is an exploded perspective view of a mounting bracket and an energy storage module according to an embodiment.

Referring to FIG. 1, according to an embodiment, a mounting bracket 100 is provided. The mounting bracket 100 can be used to mount a parking air conditioning device. In an embodiment, the parking air conditioning device includes an air conditioning host (not shown) and an energy storage module 200 for supplying power to the air conditioning host, and the mounting bracket 100 can be used to mount the energy storage module 200 to a vehicle. The energy storage module 200 may be a lithium battery pack, specifically a lithium permanganate battery pack, or a lithium iron phosphate battery pack. A type of energy storage module 200 is not limited herein.

It should be noted that the mounting bracket 100 can be used to mount not only the energy storage module 200, but also to mount other subjects to be mounted.

Figure 2:
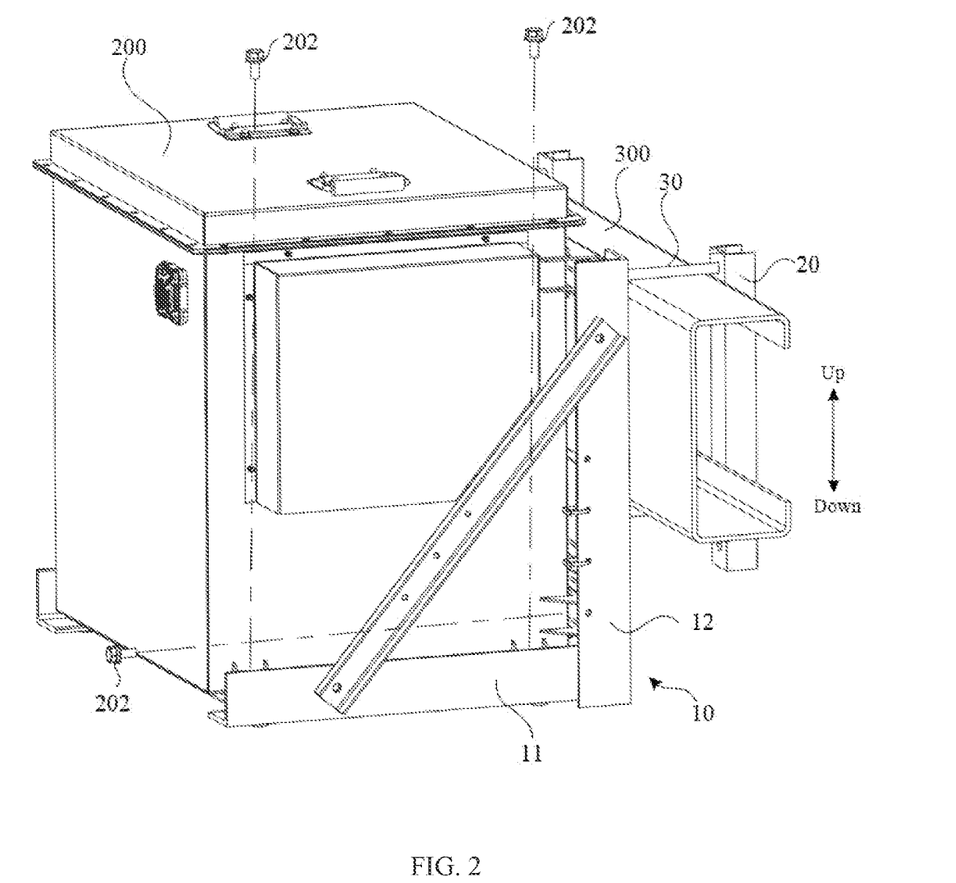
FIG. 2 is a perspective view of the mounting bracket and the energy storage module of FIG. 1 assembled together according to an embodiment.

Referring to FIG. 1 and FIG. 2, the mounting bracket 100 includes a loading frame 10, the loading frame 10 includes a bottom bracket 11 and a first connecting member 12. The bottom bracket 11 is configured to support the energy storage module 200. The first connecting member 12 is fixedly connected to the bottom bracket 11 to form a mounting position 10a. The energy storage module 200 is held in the mounting position 10a.

In some embodiments, the energy storage module 200 is located in the mounting position 10a, and the energy storage module 200 is detachably connected to the loading frame 10. In an embodiment, as shown in FIG. 1 and FIG. 2, the energy storage module 200 is provided with a plurality of connection portions 201. The connection portion 201 is connected to the loading frame 10 through screws 202. Therefore, when the energy storage module 200 needs to be replaced or maintained, the energy storage module 200 can be removed from the mounting position 10a by removing the screws 202. It should be noted that the connecting portion 201 can also be connected to the loading frame 10 through a fastener such as a bolt or a pin.

Referring to FIG. 1 and FIG. 2, the mounting bracket 100 is detachably connected to a vehicle body crossbeam 300 of the vehicle. When it is necessary to mount the parking air conditioning device, the mounting bracket 100 is firstly mounted to the vehicle body crossbeam 300, and then the energy storage module 200 of the parking air conditioning device is mounted to the mounting position 10a. In some embodiments, the energy storage module 200 can also be mounted to the mounting position 10a firstly, and then the mounting bracket 100 can be connected to the vehicle body crossbeam 300, so as to realize a connection between the energy storage module 200 and the vehicle body crossbeam 300.

In an embodiment, the mounting bracket 100 includes a second connecting member 20. The second connecting member 20 is located on a side of the first connecting member 12 away from the mounting position 10a, and the second connecting member 20 is spaced apart from the first connecting member 12, so that the vehicle body crossbeam 300 is accommodated by a space between the first connecting member 12 and the second connecting member 20. In this way, after the first connecting member 12 and the second connecting member 20 are relatively fixed, the first connecting member 12 and the second connecting member 20 can stably clamp the opposite sides of the vehicle body crossbeam 300.

In this embodiment, the mounting bracket 100 includes a plurality of first bolts 30. The first bolts 30 are configured to connect the first connecting member 12 to the second connecting member 20, so that the first connecting member 12 and the second connecting member 20 are fixed on opposite sides of the vehicle body crossbeam 300.

Figure 3:
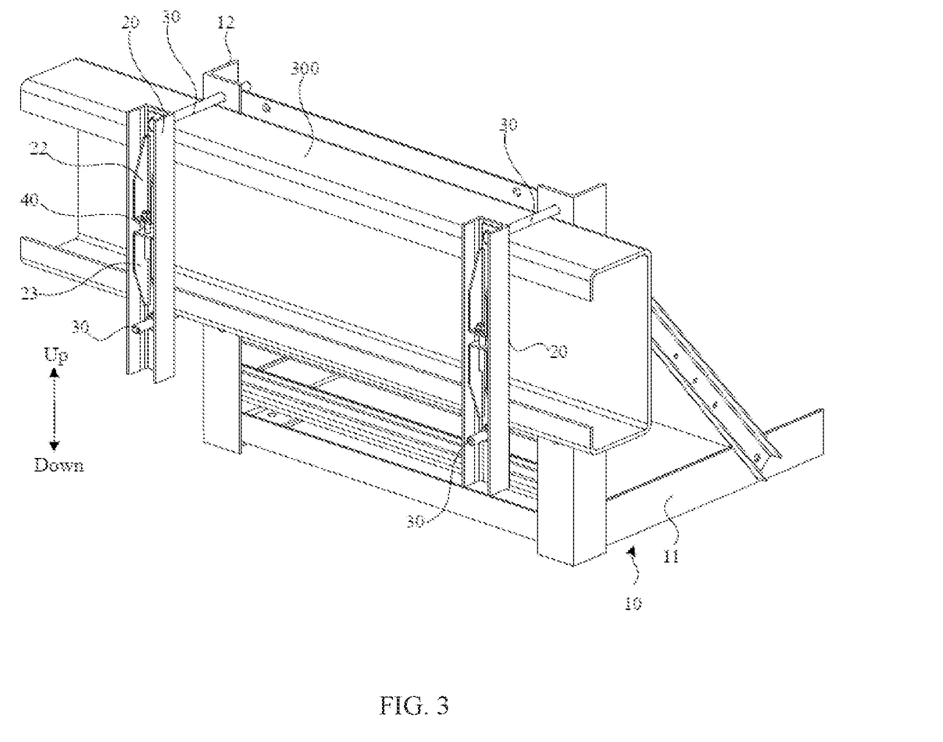
FIG. 3 is a perspective view of a mounting bracket connected to a vehicle body crossbeam.
Figure 4:
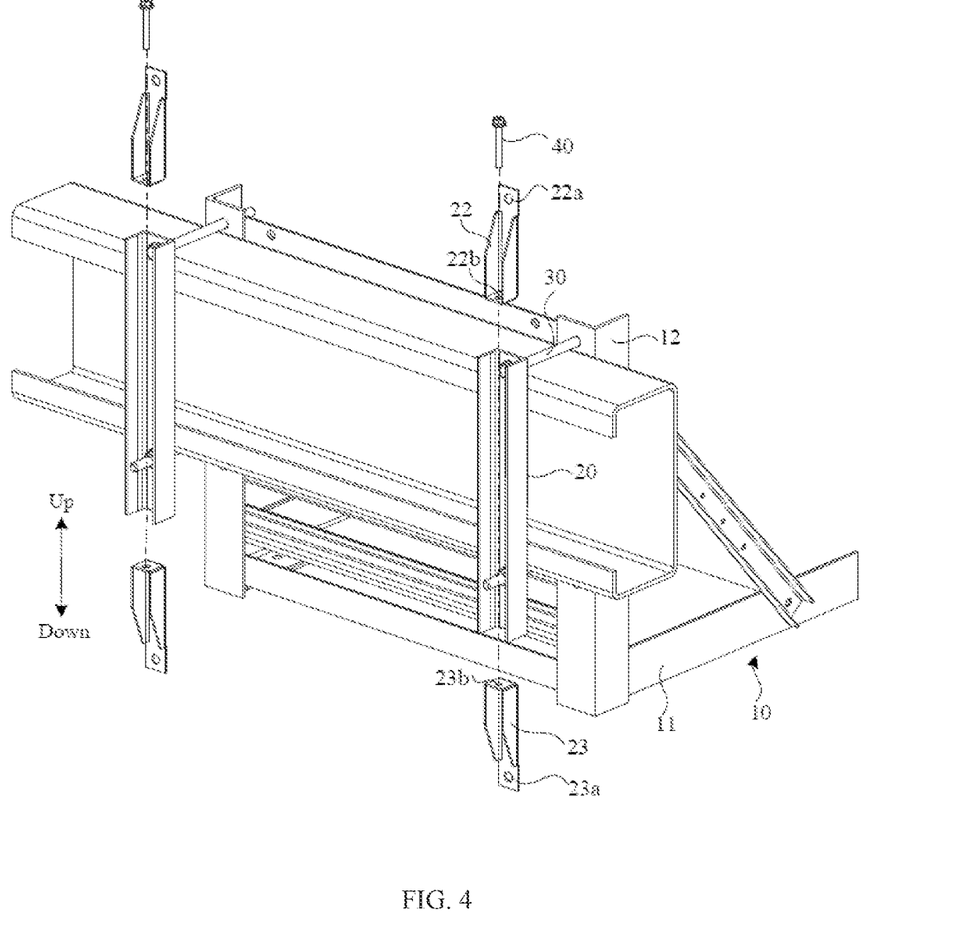
FIG. 4 is an exploded perspective view of FIG. 3.

Referring to FIG. 3 and FIG. 4, the number of the first bolts 30 is four. The four first bolts 30 are respectively located on an upper side and a lower side of the vehicle body crossbeam 300, so that the first connecting member 12 and the second connecting member 20 can clamp both sides of the vehicle body crossbeam 300 by using a locking force of the first bolts 30. It should be noted that the number of first bolts 30 is not limited to four. In some embodiments, the number of first bolts 30 may be two or three, or more than four, as long as the first connecting member 12 and the second connecting member 20 can clamp both sides of the vehicle body crossbeam 300 respectively.

It should be noted that the number of the first connecting member 12 and the second connecting member 20 can be one, or two or more, which is not limited herein. In some embodiments, the number of the first connecting member 12 and the second connecting member 20 are equal, and the first connecting member 12 and the second connecting member 20 are located on both sides of the vehicle body cross member 300 in pairs. In some embodiments, the number of the first connecting member 12 and the second connecting member 20 may be different. At this time, one or more first connecting members 12 may be connected to the same second connecting member 20, or one or more second connecting members 20 may be connected to the same first connecting member 12.

Referring to FIG. 3, when the mounting bracket 100 is connected to the vehicle body crossbeam 300, a plurality of first bolts 30 are located at the upper and lower sides of the vehicle body crossbeam 300, and the first connecting member 12 and the second connecting member 20 clamp the vehicle body crossbeam 300. It can be seen from FIG. 3 that the mounting bracket 100 can be stably connected to the vehicle body crossbeam 300 without defining holes on the vehicle body crossbeam 300, and a structural strength of the vehicle body crossbeam 300 can not be damaged, which is conducive to maintain driving safety.

Figure 5:
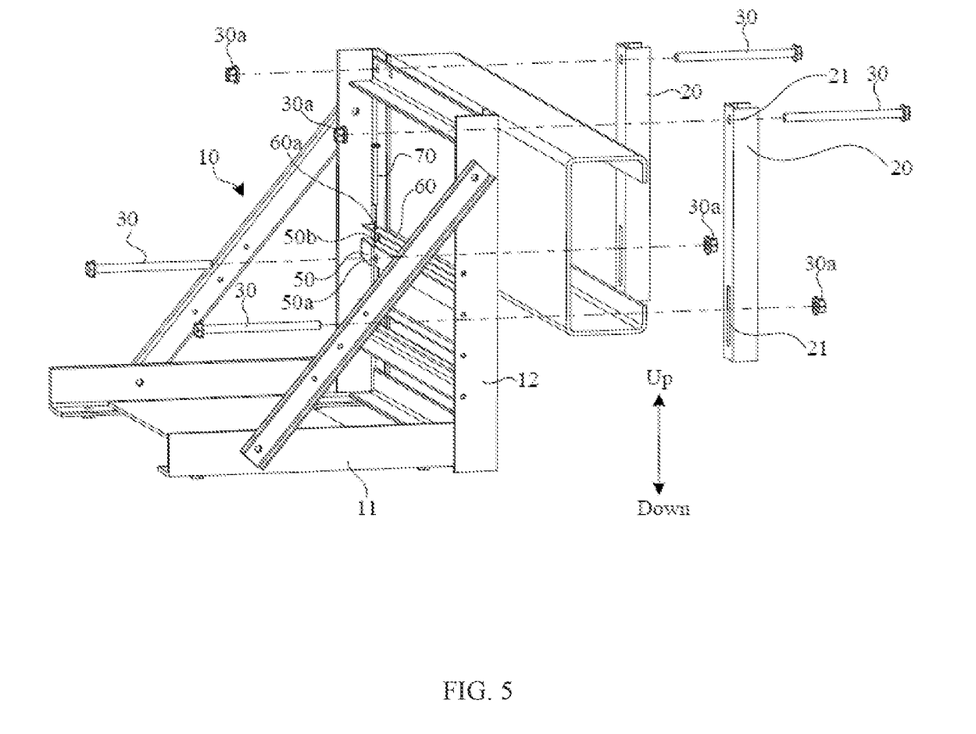
FIG. 5 is an exploded perspective view of a mounting bracket according to an embodiment.

Referring to FIG. 5, the second connecting member 20 is in a strip shape. Both ends of the second connecting member 20 are provided with first mounting holes 21. The first mounting holes 21 are used for the first bolt 30 to extend through. At least one of the first mounting holes 21 is a strip hole, and the strip hole extends along a length of the second connecting member 20, so that a relative distance between the two first bolts 30 connected to the second connecting member 20 can be adjusted. In this way, the mounting bracket 100 can be connected to the vehicle body crossbeam 300 having different sizes. In an embodiment, during the installation process, the first bolt 30 can be used to hang the first connecting member 12 and the second connecting member 20 on the vehicle body crossbeam 300. At this time, since the first bolt 30 above the vehicle body crossbeam 300 can bear the overall gravity of the mounting bracket 100, the first bolt 30 may not be locked, and the first connecting member 12 and the second connecting member 20 only need to be pre-assembled. Since the relative distance of the two first bolts 30 connected to the second connecting member 20 is adjustable, the two first bolts 30 on the second connecting member 20 can finally be close to or contact with an upper and a lower sides of the vehicle body crossbeam 300 respectively by moving the first bolt 30 extended through the strip hole. After the first connecting member 12 and the second connecting member 20 are locked by the first bolt 30, the first connecting member 12 and the second connecting member 20 can clamp the opposite sides of the vehicle body crossbeam 300 respectively to restrict the mounting bracket 100 from moving along a length direction of the first bolt 30 relative to the vehicle body crossbeam 300. Accordingly, the first bolts 30 located on the upper and lower sides of the vehicle body crossbeam 300 can restrict the mounting bracket 100 from moving up and down relative to the vehicle body crossbeam 300 to enable the connection between the mounting bracket 100 and the vehicle body crossbeam 300 to be stable, safe, and reliable.

Further, referring to FIG. 3 and FIG. 4, the second connecting member 20 is connected to a first adjusting members 22 and a second adjusting member 23. The first adjusting member 22 and the second adjusting member 23 are connected through a second bolt 40, the first adjusting member 22 and the second adjusting member 23 are respectively provided with a first through hole 22a and a second through hole 23a. The two first bolts 30 connected to the second connecting member 20 are respectively extended through the first through hole 22a and the second through hole 23a. When the second bolt 40 rotates, the first adjusting member 22 and the second adjusting member 23 move towards each other along a length direction of the second connecting member 20 to adjust a relative distance of the two first bolts 30 connected to the second connecting member 20.

It should be noted that the second bolt 40 can adjust and lock a position of the first adjusting member 22 and the second adjusting member 23 in the following manner. In an embodiment, the first adjusting member 22 is provided with a hole 22b to allow the second bolt 40 to extend though, and the second adjusting member 23 is provided with a nut 23b. The nut 23b can be connected to the second adjusting member 23 by welding or as a part of the second adjusting member 23. At this time, the nut 23b is equivalent to a threaded hole in the second adjusting member 23. A connection mode between the nut 23b and the second adjusting member 23 is not limited here.

The nut 23b is threadedly engaged with the second bolt 40. Since the first adjusting member 22 and the second adjusting member 23 are respectively connected to the first bolts 30 on the upper and lower sides of the vehicle body crossbeam 300, when the second bolt 40 rotates in a tightening direction with respect to the nut 23b, the second bolt 40 drives the first bolts 30 on the upper and lower sides of the vehicle body crossbeam 300 adjacent to each other through the first adjusting member 22 and the second adjusting member 23, and then the two first bolts 30 on the second connecting member 20 can clamp the upper and lower sides of the vehicle body cross member 300 respectively. Accordingly, when the mounting bracket 100 needs to be removed from the vehicle body crossbeam 300, the second bolt 40 rotates in a direction of loosening relative to the nut 23b. At this time, the tension force of the second bolt 40 on the first bolts 30 on the upper and lower sides of the body cross member 300 through the first adjusting member 22 and the second adjusting member 23 is relieved.

As long as one of the first adjusting member 22 and the second adjusting member 23 is provided with a hole 22b to allow the second bolt 40 to extend through, and the other of the first adjusting member 22 and the second adjusting member 23 is provided with a nut 23b, the relative distance between the first adjusting member 22 and the second adjusting member 23 can be adjusted by using the nut 23b to cooperate with a thread of the second bolt 40. Positions of the hole 22b and the nut 23b can be interchangeable.

It should be noted that the first bolt 30 can be matched with corresponding threaded holes on the first connecting member 12 and the second connecting member 20 to provide locking force. In some embodiments, as shown in FIG. 5, the first bolt 30 may be engaged with a nut 30a to clamp the first connecting member 12 and the second connecting member 20 on opposite sides of the vehicle body crossbeam 300.

Referring to FIG. 5, the first connecting member 12 is in a strip shape, and the loading frame 10 includes at least two first connecting members 12. At least two first connecting members 12 are parallel to each other, and relative positions of the at least two first connecting members 12 are fixed. In other words, the first connecting members 12 are fixedly connected to each other in the loading frame 10. In an embodiment, the first connecting members 12 can be connected by, but not limited to, angle steel or other metal strips.

A third connecting member 50 is movably provided between two adjacent first connecting members 12. The third connecting member 50 is provided with a second mounting hole 50a. The first bolt 30 extending though the second mounting hole 50a abuts the first connecting member 12 against the vehicle body crossbeam 300 through the third connecting member 50.

In an embodiment, the third connecting member 50 is used to transfer the locking force of the first bolt 30 to the first connecting member 12, so that the first connecting member 12 and the second connecting member 20 can be clamped on opposite sides of the vehicle body crossbeam 300 under the locking force of the first bolt 30. Furthermore, since the third connecting member 50 can be moved, it can adapt to a position adjustment of the first bolt 30 connected to the third connecting member 50, so as to meet a need that the first bolts 30 on the upper and lower sides of the vehicle body crossbeam 300 is limited to the vehicle body cross member 300 in the upper and lower directions.

Figure 6:
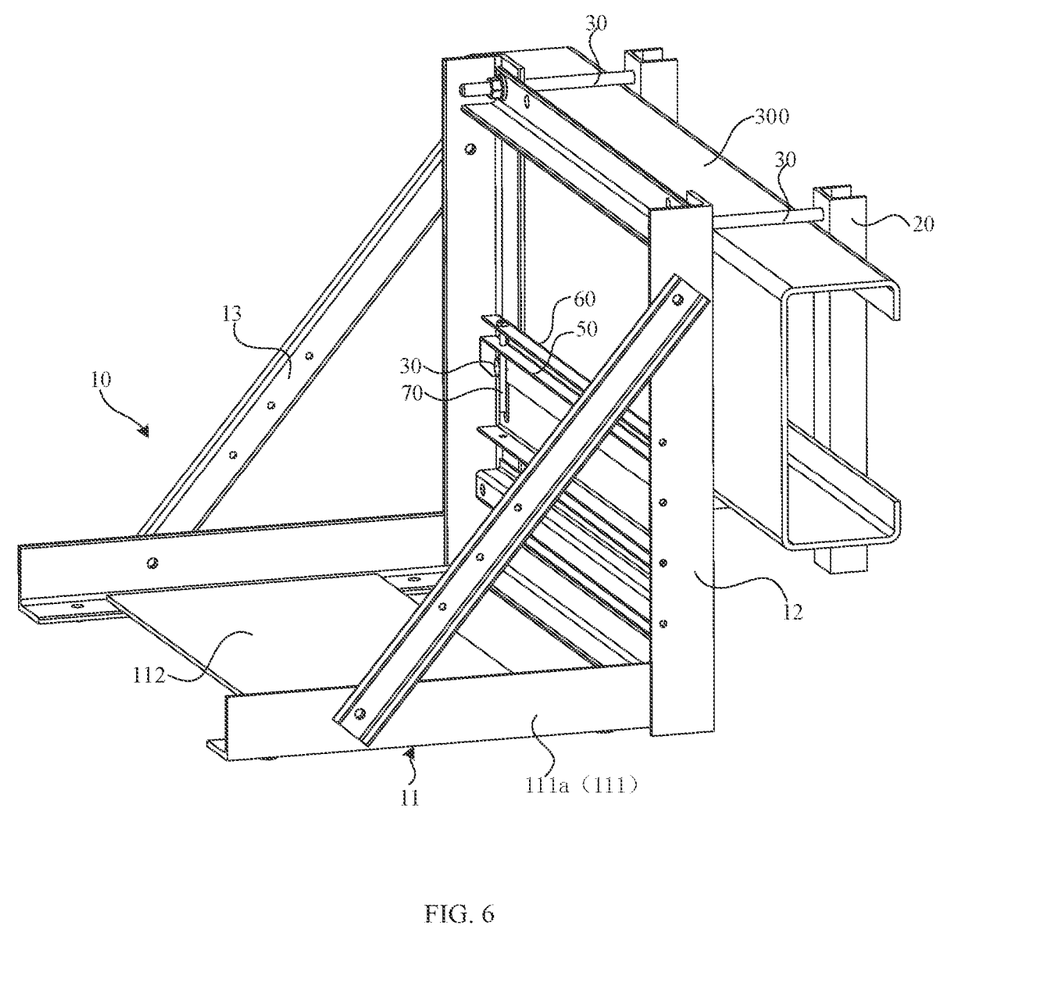
FIG. 6 is similar to FIG. 3 but viewed from another aspect.

Referring to FIG. 5 and FIG. 6, a fourth connecting member 60 is fixed between two adjacent first connecting members 12, the third connecting member 50 and the fourth connecting member 60 are respectively provided with a third hole 50b and a fourth hole 60a. The third hole 50b and the fourth hole 60a are opposite and allow a third bolt 70 to extend through. In an embodiment, the third bolt 70 is used to fix a relative position of the third connecting member 50 and the fourth connecting member 60, so that the third connecting member 50 is relatively fixed to the first connecting member 12 through the fourth connecting member 60. In this way, the position of the first bolt 30 connected to the third connecting member 50 cannot be easily loosened relative to the first connecting member 12, so as to further improve a stability of connecting the mounting bracket 100 to the vehicle body crossbeam 300.

In some embodiments, the first bolt 30 is an M12 bolt, the second bolt 40 is an M8 bolt, and the third bolt 70 is an M6 bolt. It should be noted that the first bolt 30, the second bolt 40 and the third bolt 70 can be bolts of other models. The models and lengths of these bolts are not limited here.

A structural member connected to the first bolt 30 can be a gasket (not shown) to use the gasket to achieve damping effect, so that the mounting bracket 100 has a good vibration resistance effect.

Referring to FIG. 6, in some embodiments, the bottom bracket 11 includes a frame 111 and a support plate 112. The support plate 112 is connected to the frames 111. Each frame 111 includes at least two strip members 111a, the first connecting member 12 is in a strip shape, and the first connecting member 12 is vertically connected to at least two strip members 111a.

Further, the loading frame 10 includes at least one connecting strip 13, both ends of the connecting strip 13 are respectively connected to the frame 111 and the first connecting member 12. An angle formed between the connecting strip 13 and the first connecting member 12 is acute. In this embodiment, the connecting strip 13 is used to provide tension for the frame 111, so that the bottom bracket 11 can obtain good load-bearing capacity.

In some embodiments, the angle between the connecting strip 13 and the first connecting member 12 is between 30° and 60°. In this angle range, the connecting strip 13 can withstand greater tension to improve the bearing capacity of the bottom bracket 11. The angle between the connecting strip 13 and the first connecting member 12 may be 30°, 40°, 45°, 50°, 55° or 60°.

It should be noted that the first connecting member 12 can be angle steel or channel steel. The second connecting member 20, the third connecting member 50 or the fourth connecting member 60 may also be angle steel or channel steel. Angle steel and channel steel can be made of stainless steel, iron, aluminum or aluminum alloy. The steel types and materials of the first connecting member 12, the second connecting member 20, the third connecting member 50 and the fourth connecting member 60 are not limited herein.

Although the respective embodiments have been described one by one, it shall be appreciated that the respective embodiments will not be isolated. Those skilled in the art can apparently appreciate upon reading the disclosure of this application that the respective technical features involved in the respective embodiments can be combined arbitrarily between the respective embodiments as long as they have no collision with each other. Of course, the respective technical features mentioned in the same embodiment can also be combined arbitrarily as long as they have no collision with each other.

The foregoing descriptions are merely specific embodiments of the present invention, but are not intended to limit the protection scope of the present invention. Any variation or replacement readily figured out by a person skilled in the art within the technical scope disclosed in the present invention shall all fall within the protection scope of the present invention. Therefore, the protection scope of the present invention shall be subject to the protection scope of the appended claims.

What is claimed is:

1. A mounting bracket configured to be connected to a vehicle body crossbeam, comprising:
   a loading frame comprising a bottom bracket and a first connecting member, wherein the bottom bracket is configured to support an energy storage module, the first connecting member is fixedly connected to the bottom bracket to form a mounting position cooperatively, and the mounting position configured to load the energy storage module;
   a second connecting member located on a side of the first connecting member away from the mounting position and spaced apart from the first connecting member; and
   a plurality of first bolts connected to the first connecting member and the second connecting member, wherein when the mounting bracket is connected to the vehicle body crossbeam, the plurality of first bolts respectively located at an upper side and a lower side of the vehicle body crossbeam, and enabling the first connecting member and the second connecting member to clamp the vehicle body crossbeam.

2. The mounting bracket according to claim 1, wherein the second connecting member is in a strip shape, both ends of the second connecting member are provided with first mounting holes configured to allow the first bolt to extend through, at least one of the first mounting holes is a strip hole extending along a length direction of the second connecting member, to enable that a distance between the two first bolts connected to the second connecting member is adjustable.

3. The mounting bracket according to claim 2, further comprising a first adjusting member and a second adjusting member connected to the second connecting member, wherein the first adjusting member and the second adjusting member are connected through a second bolt, the first adjusting member and the second adjusting member are provided with a first hole and a second hole, respectively, the two first bolts connected to the second connecting member extend through the first hole and the second hole, respectively, when the second bolt is rotated, the first adjusting member and the second adjusting member move towards each other along a length direction of the second connecting member.

4. The mounting bracket according to claim 3, wherein one of the first adjusting member and the second adjusting member is provided with a hole to allow the second bolt to extend through, and the other of the first adjusting member and the second adjusting member is provided with a nut engaged with a thread of the second bolt.

5. The mounting bracket according to claim 2, wherein the first connecting member is in a strip shape, the loading frame comprises at least two first connecting members, the at least two first connecting members are parallel to each other and relative positions of the at least two first connecting members are fixed, a third connecting member is movably provided between two adjacent first connecting members, and the third connecting member is provided with a second mounting hole, the first bolt extending through the second mounting hole abuts the first connecting member against the vehicle body crossbeam through the third connecting member.

6. The mounting bracket according to claim 5, further comprising a fourth connecting member fixed between two adjacent first connecting members, wherein the third connecting member and the fourth connecting member are provided with a third hole and a fourth hole, respectively, the third hole and the fourth hole are opposite and configured to allow a third bolt to extend through, and the third bolt is configured to fix a relative position of the third connecting member and the fourth connecting member.

7. The mounting bracket according to claim 6, wherein at least one of the first connecting member, the second connecting member, the third connecting member, and the fourth connecting member is an angle steel or a channel steel.

8. The mounting bracket according to claim 1, wherein the bottom bracket comprises a frame and a support plate connected to the frame, the frame comprises at least two strip members, and the first connecting member is in a strip shape and is vertically connected to at least two strip members.

9. The mounting bracket according to claim 8, wherein the loading frame comprises at least one connecting strip, both ends of the connecting strip are connected to the frame and the first connecting member, respectively, an angle formed between the connecting strip and the first connecting member is acute.

10. The mounting bracket according to claim 9, wherein the angle formed between the connecting strip and the first connecting member is between 30° and 60°.

11. A parking air conditioning device mounted to a vehicle body crossbeam, comprising:
   an air conditioning host;
   an energy storage module configured to supply power to the air conditioning host; and
   a mounting bracket comprising:
      a loading frame comprising a bottom bracket and a first connecting member, wherein the bottom bracket is configured to support the energy storage module, the first connecting member is fixedly connected to the bottom bracket to form a mounting position cooperatively, and the mounting position configured to load the energy storage module;
   a second connecting member located on a side of the first connecting member away from the mounting position and spaced apart from the first connecting member; and
   a plurality of first bolts connected to the first connecting member and the second connecting member, wherein when the mounting bracket is connected to the vehicle body crossbeam, the plurality of first bolts respectively located at an upper side and a lower side of the vehicle body crossbeam, and enabling the first connecting member and the second connecting member to clamp the vehicle body crossbeam.

* * * * *